March 26, 1929.   H. L. ALLEN   1,706,510
WEIGHING SCALE
Filed May 23, 1925
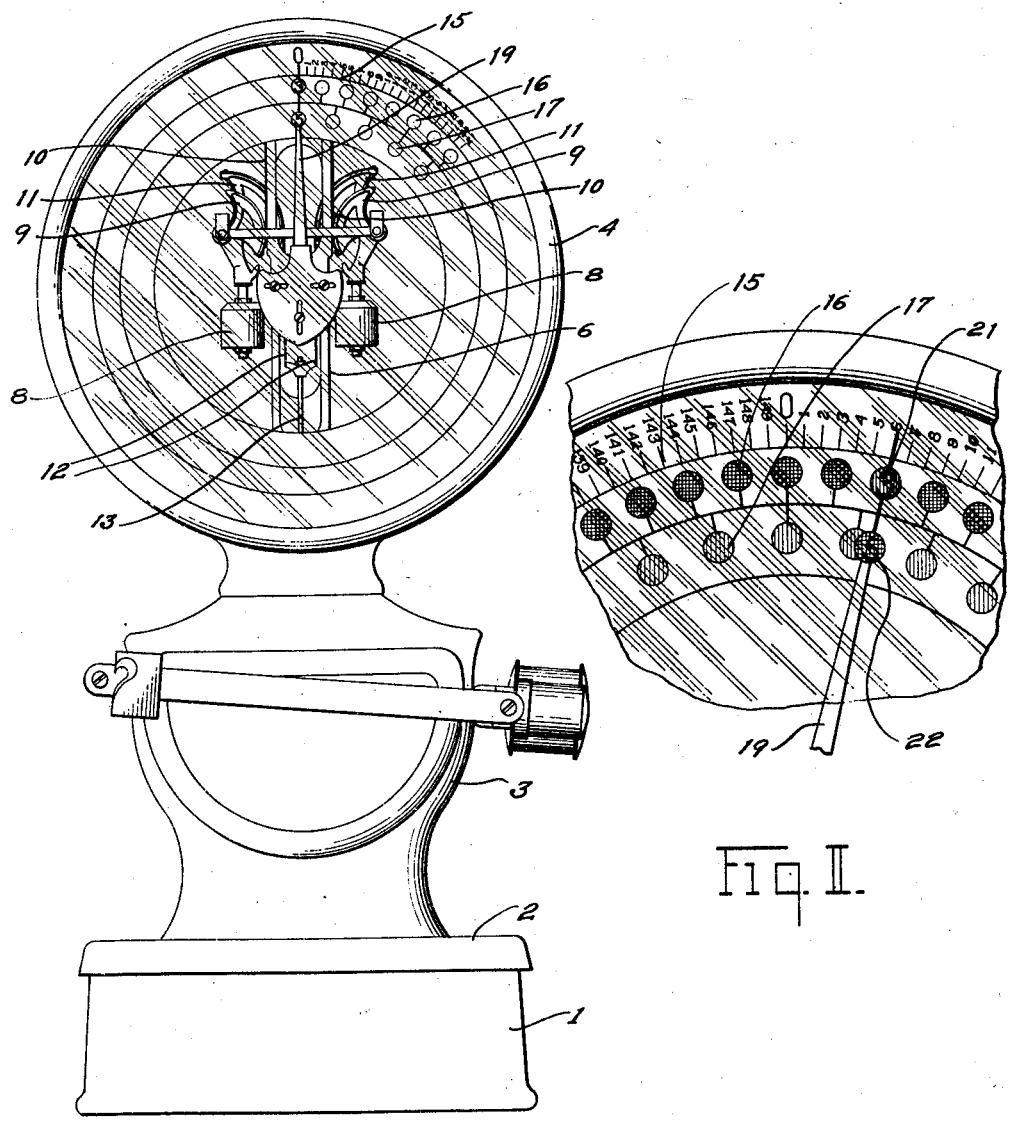
Inventor
HUGH L. ALLEN.
By E.D. Marshall,
Attorney Patented Mar. 26, 1929.

1,706,510

UNITED STATES PATENT OFFICE.

HUGH L. ALLEN, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed May 23, 1925. Serial No. 32,265.

This invention relates to weighing scales, and more particularly to improvements in indicating devices therefor.

In the manufacture of certain materials, as, for example, rope, cloth, netting material and other similar materials which are fabricated or woven into continuous strips, it is often necessary to cut the strips of material into certain predetermined lengths. This is usually accomplished by the slow operation of measuring or by placing a quantity of the material upon a scale platform and then removing therefrom predetermined quantities by noting the decrease in weight of the material upon the platform as the material is removed therefrom. The operator is usually at a distance from the scale and it is very difficult for him to determine the exact position of the indicator hand without moving to a position in juxtaposition to the scale chart every time a quantity of material is removed from the scale. One of the principal objects of this invention is the provision of efficient and accurate means for indicating weights, the indication being readily visible at a comparatively great distance from the scale.

Another object of this invention is the provision of an indicating means for weighing scales whereby the relative positions of the indicator and chart are indicated by the occulting or temporary concealing of one of a plurality of prominently colored spots.

Another object is the provision of a weighing and indicating mechanism whereby certain predetermined quantities of material may be removed from the scale platform and the weights thereof indicated automatically by a prominently displayed indication.

Another object of this invention is the provision of an automatic means for successively indicating quantities of material which may be removed from a bulk of material situated upon the scale platform without the manipulation of manually operated devices.

Still a further object of the invention is the provision of an indicating means for indicating the weight of an article or articles by occulting the weight graduation on the scale dial by a differently colored indicator hand.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale embodying my invention;

Figure II is an enlarged fragmentary view of a portion of the scale illustrating the embodiment of my invention.

Referring to the drawings in detail, I have shown my invention as incorporated in a weighing scale of a well known type, but it is to be understood that I contemplate the incorporation of my invention in any device wherever the same may be found applicable. The weighing scale illustrated comprises a base 1 adapted to house a lever system (not shown) upon which is supported a load receiving platform 2. Erected upon one end of the base 1 is a hollow column 3, and superimposed upon the upper portion of the latter is a substantially watch-case-shaped housing 4 adapted to support and house the load counterbalancing and indicating mechanism.

The load counterbalancing and indicating mechanism is supported upon a frame 6 and comprises a pair of oppositely disposed pendulums 8 having fulcrum sectors 9 fixed thereto suspended from the frame 6 by means of flexible metallic ribbons 10. The pendulums are also provided with power sectors 11 connected by means of ribbons 12 and steelyard rod 13 to the platform lever mechanism (not shown). It will be obvious that a load placed upon the platform 2 exerts a downward pressure upon the platform lever mechanism and steelyard rod 13, thus swinging the pendulums 8 outwardly and upwardly until such load is counterbalanced.

The weight indicating means of my invention comprises a substantially circular chart 15 located within the housing 4 and provided with a plurality of spots 16 and 17 successively spaced upon the chart. The spots are preferably arranged in two rows around the chart, the spaces between the centers of the spots representing certain definite increments in weight. As portrayed in the particular embodiment, the spots 16 of the outer row are spaced so as to indicate increments of weight of 3 lbs. each and are preferably black in color. The spots 17 comprising the inner row are preferably colored red so as to distinctively differentiate these spots from those of the outer row and are so spaced as to represent weight increments of 5 lbs. An indicating hand 19 suitably connected to the pendulums by rack and pinion mechanism (not shown) is adapted to cooperate with the chart. The hand is formed with enlarged portions substantially equal in area to one of the spots, the portion 21 thereof being preferably colored red and adapted to swing over the outer row of black spots, the portion 22 of the hand being colored black and adapted to swing over the inner row of red graduations. It will be apparent that as the indicator hand 19 acting under the influence of the weighing mechanism is moved over the chart 15, the circular portions of the hand successively occult cover certain of the spots, the occulted spots on the chart indicating or representing certain weights. Thus, for example, in the operation and use of my device, a number of pounds of rope or other material is placed upon the scale platform, causing the indicator to move to a certain weight indicated by the occulting of a certain spot on the chart by one of the disk portions on the indicator hand 19. It will be obvious that if a portion of the material is removed from the scale platform the indicator 19 will move in a counter-clockwise direction and when the next successive spot of the proper row is covered by the indicator a decrease in the load on the scale platform is indicated which is equal to the weight represented by the spacing of the spots—viz, in the case of the outer row, 3 lbs., and as to the inner row, 5 lbs.

In this manner it is possible to divide a given quantity of material into several equal portions without unnecessary shifting of weights and undue strain on the eyes of the operator, as the spots may be comparatively large and therefore easily visible even at considerable distances from the scale.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism, a relatively movable chart and indicating element co-operating with said weighing mechanism, a spot of substantial area on said chart, and means on said indicating element of substantially the same shape as said spot for substantially occulting and registering with said spot to indicate the relative position of said chart and indicating element 2. In a device of the class described, in combination, a relatively movable chart and indicating element, a plurality of spots of substantial area arranged in sequence on said chart, and means on said indicating element of substantially the same shape as said spots for substantially occulting and registering with certain of said spots to indicate the relative positions of said chart and indicating element.

3. In a device of the class described, in combination, weighing mechanism, a relatively movable chart and indicating element co-operating with said weighing mechanism, a plurality of spots of substantial area arranged in sequence on said chart, and means on said indicating element of substantially the same shape as said spots for substantially occulting and registering with certain of said spots to indicate the relative positions of said chart and indicating element.

4. In a device of the class described, in combination, weighing mechanism, a chart, an indicating element co-operating with the weighing mechanism and adapted to swing over the chart, a plurality of substantially circular spots arranged in sequence on said chart, and means on said indicating element comprising a substantially circular portion for occulting certain of said spots on the chart to indicate the relative position of said indicating member.

5. In a device of the class described, in combination, weighing mechanism, a chart, an indicating element co-operating with the weighing mechanism and adapted to swing over said chart, a plurality of spots substantially evenly spaced on said chart, and means of substantially the same shape as said spots on said indicating element for substantially occulting and registering with one of said spots to indicate the relative position of said chart and indicating element.

6. In a device of the class described, in combination, weighing mechanism including a load receiving element adapted to receive loads to be weighed, a relatively movable chart and index adapted to co-operate with the weighing mechanism, a plurality of spots successively spaced on said chart, and means of substantially the same shape as said spots on said index arranged so as to occult and register with certain of said spots to indicate the weight of a load upon the platform.

7. In a device of the class described, in combination, weighing mechanism including a load receiving platform, a relatively movable chart and index adapted to co-operate with the weighing mechanism, a substantially circular portion forming a part of said index, a plurality of spots successively arranged on said chart in the path of the circular portion of the index, certain of said spots adapted to be selectively occulted by said index to indicate the weight of loads upon the scale platform.

8. In a device of the class described, in combination, weighing mechanism, a relatively movable chart and index co-operating therewith, a plurality of spots on said chart arranged to represent successive increments in weight, said index having a portion thereof substantially the same shape as said spots and adapted to substantially occult and register with certain of said spots to indicate certain weights.

9. In a device of the class described, in combination, weighing mechanism, a relatively movable chart and index co-operating with said weighing mechanism, and a plurality of substantially circular spots on said chart arranged to represent successive increments in weight, said index having a portion thereof substantially of the same shape and area as one of said spots and adapted to be brought into substantial coincidence with certain of said spots to indicate certain weights.

10. In a device of the class described, in combination, weighing mechanism, a chart bearing a plurality of rows of spots, and an indicating hand co-operating with said weighing mechanism and having portions thereof substantially of the same shape and area as one of said spots, said hand being capable of movement over said chart to move said portions successively into coincidence with certain of said spots to indicate certain weights.

11. In a device of the class described, in combination, a frame, weighing mechanism supported upon said frame, a chart bearing a plurality of rows of differently colored spots representing successive increments of weight, said spots being substantially circular, and an indicating hand having certain portions thereof adapted to co-operate with said chart to successively coincide with certain of said spots to indicate certain weights.

HUGH L. ALLEN.